H. RAFLOVICH.
TIRE MOLD.
APPLICATION FILED FEB. 2, 1921.

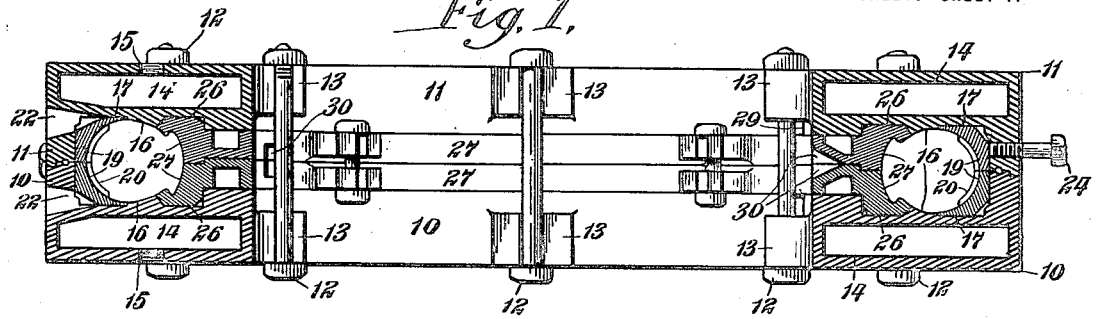

1,432,901.

Patented Oct. 24, 1922.
2 SHEETS—SHEET 2.

Inventor
Harry Raflovich
by Geyer Poole
Attorneys.

Patented Oct. 24, 1922.

1,432,901

UNITED STATES PATENT OFFICE.

HARRY RAFLOVICH, OF BUFFALO, NEW YORK.

TIRE MOLD.

Application filed February 2, 1921. Serial No. 441,919.

*To all whom it may concern:*

Be it known that I, HARRY RAFLOVICH, a citizen of the United States, residing in Buffalo, in the county of Erie and State of New York, have invented new and useful Improvements in Tire Molds, of which the following is a specification.

This invention relates to a mold for vulcanizing tires such as are commonly used on wheels for automobiles and more particularly pneumatic tires of this character which are of horse-shoe form in cross section and have their flanges provided with external annular beads whereby the same are fastened to the rim of the wheel.

In tire molds of this character as heretofore constructed, particularly those intended for use in re-treading or re-surfacing the worn parts of the tire, it has been very difficult to separate or "break apart" the different co-operating sections of the mold after said mold has served its function of vulcanizing the tire. The sticking or adhering together of the different mold sections is caused by the considerable heat to which the mold is subjected for a considerable time and also by reason of the adhering rubber which exudes more or less from the tire which is being vulcanized.

It is the purpose of this invention to provide a mold having sections which may be easily broken apart or separated from each other.

Figure 4:
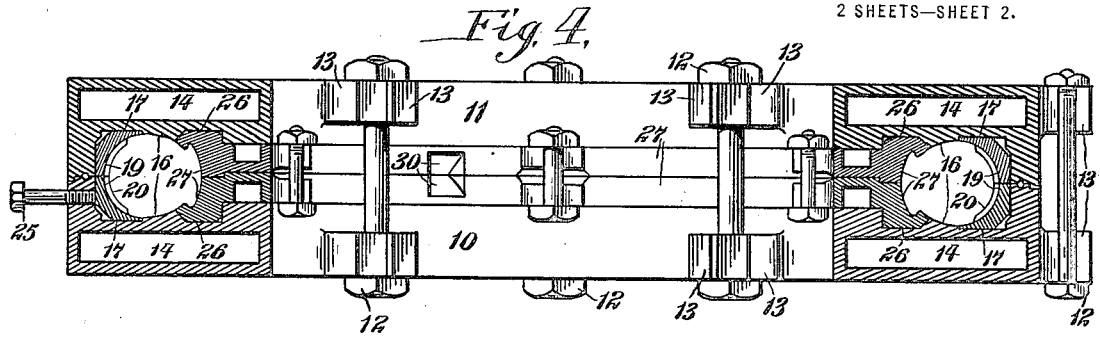
Figure 5:
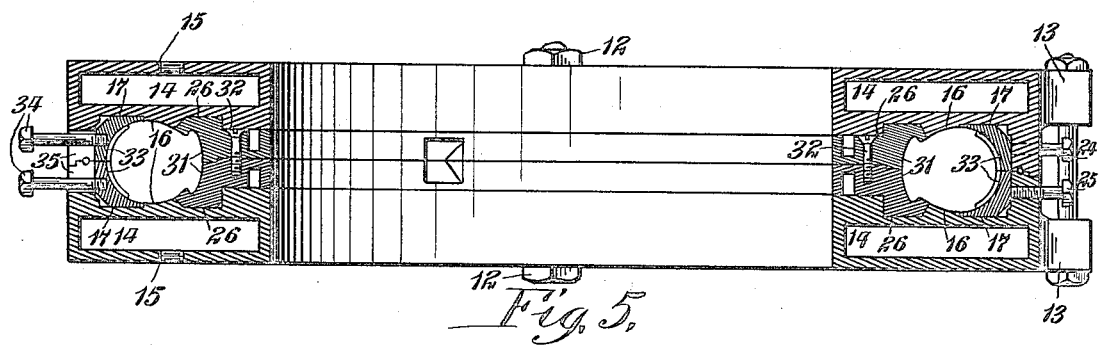

In the accompanying drawings:

Figure 1 is a vertical diametrical or transverse section through the entire tire mold taken on line 1—1, Fig. 2. Figure 2 is a top plan view of the complete assembled tire mold. Figure 3 is a vertical radial section through one side of the mold taken on line 3—3, Fig. 2. Figure 4 is a vertical diametrical or transverse section through the complete mold taken on line 4—4, Fig. 2. Figure 5 is a vertical diametrical or transverse section through a modified form of tire mold.

Similar characters of reference refer to like parts throughout the several views.

The body of the mold comprises a lower main section 10 and an upper main section 11, both of which are of annular form and are detachably connected by means of vertical bolts 12, which engage with corresponding lugs 13 on both the inner and outer side of said main body sections.

It is in these main mold sections that the casing of a pneumatic automobile tire is adapted to be formed and vulcanized, said main sections being provided with the usual steam jackets 14 for heating the same, the steam being admitted into said jackets and removed therefrom through suitable screw threaded apertures 15. On the opposing central parts of their interior surfaces, the main sections are provided with interior faces 16 which constitute the sides of the mold cavity and are constructed to form the outer lateral sides of the flanges of the tire casing.

The opposing outer parts of the main sections are constructed to form two corresponding outer seats 17, preferably in the form of annular channels. These outer seats are removably engaged by the outer surfaces of two interchangeable tread or outer mold sections 19, 19 which latter have their inner surfaces constructed to form the particular kind of surface desired on the tread of the casing. The drawings show the tread or outer sections provided with transverse grooves 20 which form corresponding transverse ribs on the annular surface of the finished tire casing. However, a pair of different outer-tread sections having different inner surfaces may be substituted for the particular pair 19 shown in the drawings. Ordinarily however the removal of these outer tread sections 19 from the main body sections 10 and 11 is rendered very difficult, particularly after long continued use, by reason of the high temperatures to which these parts are subjected, combined with the fact that sticky rubber and cement is apt to be exuded into the cracks between the different parts and thus firmly cement the same together. In this improved tire mold, the removal of these outer tread sections 19 away from the main body sections 10 and 11 is facilitated (in the construction shown in Figs. 1-4 inclusive) by the formation of two pairs of tapered prying slots 22 which extend radially inwardly toward the center of the tire mold. Each prying slot 22 is formed by a companion pair of coaxially disposed inclined grooves which converge inwardly toward each other and are formed respectively in the peripheries of the interior faces of the main sections (10 and 11) and the exterior faces of their companion outer tread sections 19. In separating either one of said outer tread sections 19 from its companion main body section, the workman simply puts the point of a screw driver into the said prying slots 22 and prys out the outer tread sections. If the latter is adhering unduly strongly he can powerfully drive a cold chisel into said prying slot without the liability of fracturing any of the parts. After the one pair of outer tread sections 19 have been removed, and the desired other pair replaced in the outer seats 17, the latter are firmly held in place by means of upper set screws 24 and lower set screws 25, which same pass through the outer walls of the main body sections and bear, with their inner ends, against the peripheral faces of the outer tread sections 19.

The opposing inner parts of the main body sections 10 and 11 are constructed to form two corresponding inner seats 26, preferably in the form of annular channels. These inner seats are removably engaged by the outer surfaces of two interchangeable inner mold sections 27 which latter have their outer surfaces constructed to form the particular kind of surface desired on the bead or inner part of the automoblie tire casing. The particular inner mold sections shown in the drawings are constructed to form a beaded pneumatic tire casing such as is used on an ordinary clincher rim, but said inner mold sections are, if desired, replaceable by inner mold sections of different shape such for instance as are used in vulcanizing straight walled tires. As in the case of the outer tread sections 19, however, these inner sections are apt to become very firmly attached to their companion main body sections 10 and 11 respectively. To facilitate the removal thereof, as best shown in Fig. 3, a pair of wedging slots 29 are formed at the inner part of the interior face of each main body section. Thus the workman need merely place a screw-driver, cold chisel or other bar in any one of said wedging slots 29 and pry off the companion inner section 27. The adjacent inner part of the interior face of each inner mold section 27 is provided with a pair of tapered opening slots 30, the companion slots of the two inner mold sections being axially in alignment. This construction permits the workman to drive in a screw driver or cold chisel and drive the two inner mold sections 27 apart from each other.

Modified construction of tire mold is disclosed in Fig. 5. In this case the inner mold sections 31 are adapted to be clamped together by countersunk screws 32. Screwed into or otherwise permanently secured to the peripheral faces of each of the outer tread sections 33 are a number of loosening handles 34, each of which is receivable within a clearance notch 35 which is located in the outer part of the companion main body section and extends axially inwardly and opens into the interior face of said companion main body section. By this construction the workman is enabled to either grasp one of said loosening handles 34 and remove the companion outer tread section out from its annular seat in the companion main body section. Also said workman may seize the companion, co-axially disposed loosening handles 34, 34 on the two outer tread sections and break them apart from each other. In either case, said workman is enabled to readily grasp either one of said outer tread sections, and remove the same conveniently from either the companion main body section or from the other outer tread section.

I claim as my invention:

1. A tire mold comprising a main section having the central part of its interior surface constructed to form one side of the mold cavity which produces one side of the tire and having its outer part constructed to form an annular outer seat and furthermore provided with a prying slot opening into said seat, and an outer tread section engaging removably with said seat.

2. A tire mold comprising upper and lower main sections having the opposing central parts of their interior faces constructed to form the opposite sides of the mold cavity which produces the sides of the tire and having their outer parts constructed to form two corresponding outer seats and furthermore provided with inclined prying slots opening into said seats, and outer tread sections engaging removably with said seats.

3. A tire mold comprising a main section having the central part of its interior surface constructed to form one side of the mold cavity which produces one side of the tire and having its outer part constructed to form an annular outer seat and furthermore provided with an inclined outside prying slot opening into said seat, and an outer tread section engaging with said seat and provided with an inclined inside prying slot disposed adjacent to and coaxially with the said outside prying slot of said main section.

4. A tired mold comprising a main section having the central part of its interior surface constructed to form one side of the mold cavity which produces one side of the tire, and having its outer part constructed to form an annular outer seat, an outer tread section engaging removably with said seat, and mechanical means for preventing lateral displacement of said outer tread section relatively to said main section before the mold is clamped upon the tire casing.

5. A tire mold comprising a main section having the central part of its interior surface constructed to form one side of the mold cavity which produces one side of the tire and having its outer part constructed to form an annular outer seat, an outer tread section engaging removably with said seat, and a set screw in threaded engagement with said main section and adapted to bear against said outer tread section.

6. A tire mold comprising a main section having the central part of its interior surface constructed to form one side of the mold cavity which produces one side of the tire, and having its inner part constructed to form an annular inner seat and furthermore provided with a wedging slot opening into said seat, and an inner tread section engaging removably with said seat.

7. A tire mold comprising a main section having the central part of its interior surface constructed to form one side of the mold cavity which produces one side of the tire, and having its inner part constructed to form an annular inner seat, an inner tread section provided on its inner face with an opening slot and engaging said seat in said main section.

8. A tire mold comprising a main section having the central part of its interior surface constructed to form one side of the mold cavity which produces one side of the tire and having its inner part constructed to form an annular inner seat, an inner tread section provided on its inner face with an inclined opening slot and engaging with said seat in said main section.

9. A tire mold comprising upper and lower main sections having the opposing central parts of their interior faces constructed to form the opposite sides of the mold cavity which produces the sides of the tire and having their inner parts constructed to form two corresponding inner seats, and inner tread sections engaging removably with said inner seats and provided on their adjacent inner faces with companion opening slots which are disposed co-axially with respect to each other.

10. A tire mold comprising upper and lower main sections having the opposing central parts of their interior faces constructed to form the opposite sides of the mold cavity which produces the sides of the tire and having either inner parts constructed to form two corresponding inner seats, and furthermore provided with wedging slots which open into said inner seats, and inner tread sections engaging removably with said inner seats and provided on their adjacent inner faces with companion inwardly tapering opening slots, which are disposed coaxially with respect to each other.

HARRY RAFLOVICH.